US012716980B2

(12) United States Patent
Klingbeil et al.

(10) Patent No.: US 12,716,980 B2
(45) Date of Patent: Aug. 25, 2026

(54) AUTOMATED SYNCHRONIZATION OF LOCATIONS OF MOVABLE ITEMS

(71) Applicant: SAP SE, Walldorf (DE)

(72) Inventors: Thomas Klingbeil, Potsdam OT Neu Fahrland (DE); Sebastian Kliem, Potsdam (DE); Wanja Pasternak, Falkensee (DE)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 18/534,996

(22) Filed: Dec. 11, 2023

(65) Prior Publication Data

US 2025/0189614 A1 Jun. 12, 2025

(51) Int. Cl.
*G01S 5/00* (2006.01)
*G01S 5/14* (2006.01)

(52) U.S. Cl.
CPC .............. *G01S 5/0018* (2013.01); *G01S 5/14* (2013.01)

(58) Field of Classification Search
CPC ....... G01S 5/0018; G01S 5/02521; G01S 5/14
See application file for complete search history.

(56) References Cited

U.S. PATENT DOCUMENTS

| | | | | |
|---|---|---|---|---|
| 10,891,582 | B2 | 1/2021 | Klingbeil et al. | |
| 11,185,982 | B2 * | 11/2021 | Lee | B25J 9/1664 |
| 11,305,416 | B1 * | 4/2022 | Correnti | G05B 19/042 |
| 2018/0259973 | A1 * | 9/2018 | Maruo | G05D 1/0011 |
| 2018/0361581 | A1 * | 12/2018 | Williams | A47L 11/00 |
| 2018/0361585 | A1 * | 12/2018 | Williams | A47L 11/14 |
| 2020/0401031 | A1 * | 12/2020 | Ikeda | H04N 21/4122 |
| 2023/0100529 | A1 * | 3/2023 | Petroulas | G06Q 30/0206 705/4 |
| 2023/0334863 | A1 * | 10/2023 | Green | G06V 10/25 |

* cited by examiner

*Primary Examiner* — Kashif Siddiqui
(74) *Attorney, Agent, or Firm* — Buckley, Maschoff & Talwalkar LLC

(57) ABSTRACT

Systems and methods include determination of a location of each of a plurality of movable service hubs, generation of a first map depicting the determined locations of each of the hubs, association of a first service with a first location of the depicted locations, wherein the first service is provided to a first hub located at the first location based on the first map, determination that one or more of the hubs has moved more than a threshold distance, determination of a second location of each of the hubs and generate a second map depicting the determined second locations of each of the hubs, and association of a second service with a third location of the depicted second locations, wherein the second service is provided to a second hub located at the third location based on the second map.

15 Claims, 7 Drawing Sheets

600
650 FULFILLMENT SYSTEM
660 DELIVERY SYSTEM
640 SERVICE SYSTEM
645 ORDERS
621 Beacon
622 Beacon
620 RECEIVER
610 LOCATION DETERMINATION SYSTEM
623 Beacon
624 Beacon
625 Beacon
630
634 SERVICE HUB MAPS
632 CALIBRATION DATA

800

| LOCATION | $R_1$ SIGNAL STRENGTH | $R_2$ SIGNAL STRENGTH | $R_3$ SIGNAL STRENGTH | $R_4$ SIGNAL STRENGTH |
|---|---|---|---|---|
| $H_0$, $V_0$ | 95 | 62 | 32 | 50 |
| $H_0$, $V_1$ | 92 | 60 | 33 | 53 |
| $H_0$, $V_2$ | 90 | 58 | 35 | 55 |
| ... | ... | ... | ... | ... |
| $H_4$, $V_5$ | 72 | 70 | 71 | 72 |
| ... | ... | ... | ... | ... |
| $H_8$, $V_9$ | 98 | 55 | 37 | 62 |

1000

| BEACON ID | $R_1$ SIGNAL STRENGTH | $R_2$ SIGNAL STRENGTH | $R_3$ SIGNAL STRENGTH | $R_4$ SIGNAL STRENGTH | ESTIMATED LOCATION |
|---|---|---|---|---|---|
| A | 80 | 65 | 45 | 65 | $H_2$, $V_3$ |
| B | 80 | 70 | 60 | 48 | $H_6$, $V_5$ |
| C | 60 | 58 | 83 | 82 | $H_4$, $V_7$ |

AUTOMATED SYNCHRONIZATION OF LOCATIONS OF MOVABLE ITEMS

BACKGROUND

Many systems rely on accurate and timely knowledge of the locations of devices, packages, components and/or people. For example, a shipping company may affix a barcode to a package, scan the barcode at various checkpoints throughout the package's journey, and report each scan to a central server so that the current location and future delivery time of the package may be estimated. In another example, an equipment leasing company may mount a GPS tracker to leased equipment, allowing the company to always pinpoint the location of the equipment.

In a service environment, such as a restaurant, customers are usually seated at tables or defined stations at which they are served. The tables/stations are usually defined by a number, and a commonly-known map is provided to employees which associates each number with a location. Accordingly, by referring to the map, an employee may associate a desired service (e.g., food order) with a number and, using the number and the map, an employee providing the service will know to where the service should be delivered.

The foregoing scenario presents challenges if the items to be associated with services (e.g., the tables) are movable. Movement of the items from their mapped locations may cause difficulties in determining an item number to associate with a service and also in determining to where the service should be delivered. Some systems allow manual reconfiguration of item locations within a map and/or the ability to select from different maps corresponding to different item location configurations. However, these systems require manual intervention and do not easily cope with non-standard item location configurations.

Systems are desired to efficiently synchronize locations of movable items to which services are associated and delivered.

DETAILED DESCRIPTION

The following description is provided to enable any person in the art to make and use the described embodiments. Various modifications, however, will remain readily-apparent to those in the art.

Some embodiments facilitate the synchronization of a map of movable items to systems used to associate services with the items and to deliver services to the items. For example, each item may be equipped with a wirelessly-detectable device (e.g., a Bluetooth Low Energy (LE) beacon) and corresponding infrastructure (e.g., fixed receivers) may be employed to monitor the locations of the devices. A map of the items is generated based on the locations, with each of the mapped items being assigned an identifier. The map, which is automatically updated to reflect changes to the item locations, is used to associate services with the item identifiers and to accurately deliver services to the items.

Figure 1:
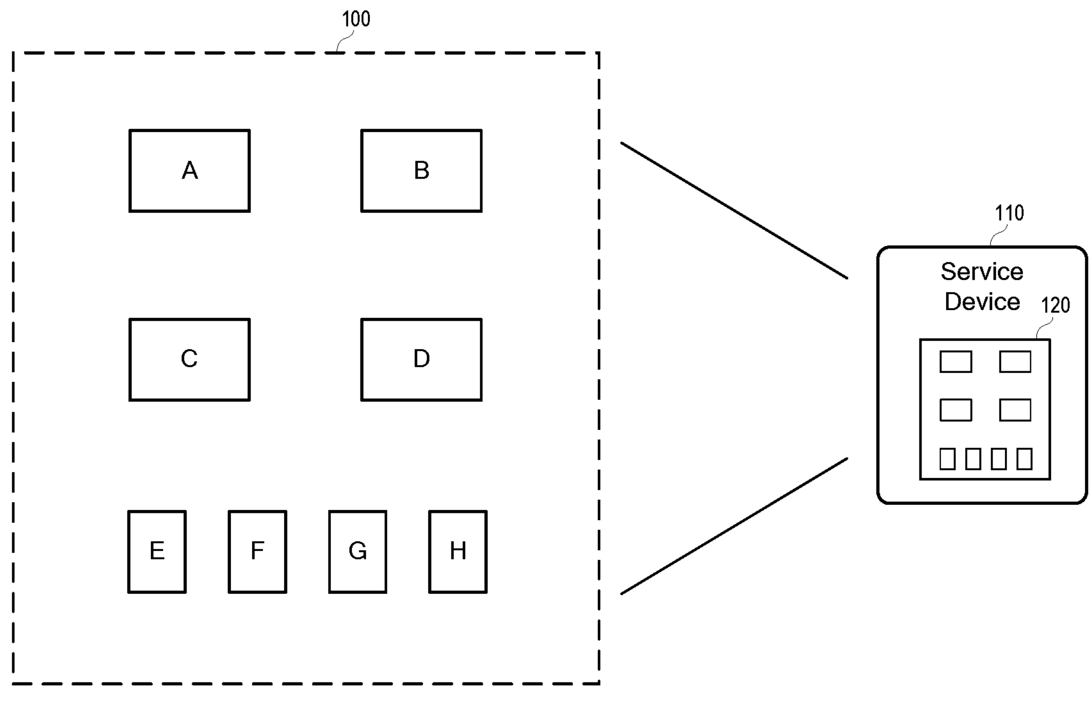
FIG. 1 is an architecture of a system to provide automated synchronization of locations of movable items according to some embodiments.

FIG. 1 is an architecture of a system to provide automated synchronization of locations of movable items according to some embodiments. Area 100 delineates a physical area in which items A through H are located. Area 100 may comprise one or more rooms, floors and/or buildings. Area 100 itself may be movable, such as an area on a vessel or an area within a movable container, for example.

Items A through H may comprise the same type or different types of items. In some embodiments, items A through H are tables or other items at which one or more people may wait for a service. As depicted, tables A through D are of a first size and tables E through H are of a second size, but embodiments are not limited thereto. Embodiments are also not limited to the number and arrangement of tables A through H within area 100.

As will be described below, embodiments may operate to generate a map depicting the locations of tables A through H within area 100. Generation of the map may rely on a dedicated wirelessly-detectable device mounted to or otherwise associated with each of tables A through H. Detection of a given wirelessly-detectable device includes detection of the location of the given device and of an identifier of a table with which the given device is associated.

Alternatively, the location of tables could be determined by cameras. For example, each of tables A through H may bear a specific marker which allows one to be distinguished from another visually. Such cameras may be calibrated to map visual positions from camera perspective to a map location.

Figure 2:
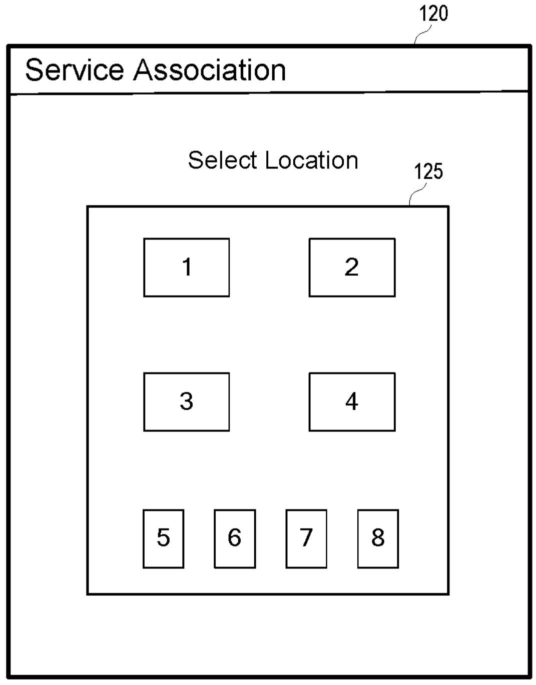
FIG. 2 is a user interface of a system presenting a synchronized map of item locations according to some embodiments.

Service device 110 may comprise any suitable computing device for presenting user interface 120. An example of user interface 120 is shown in FIG. 2. In some embodiments, service device 110 is a portable point-of-sale system which allows an operator to associate a service with an item displayed on map 125. For example, in a case that items A through H are tables within a restaurant, a server may operate user interface 120 of service device 110 to input one or more food orders and to associate the one or more food orders with one of location identifiers 1 through 8. Accordingly, once the one or more food orders are prepared, the server or another employee may determine the location at which the food should be served by referring to the map and the associated location identifier.

Figure 3:
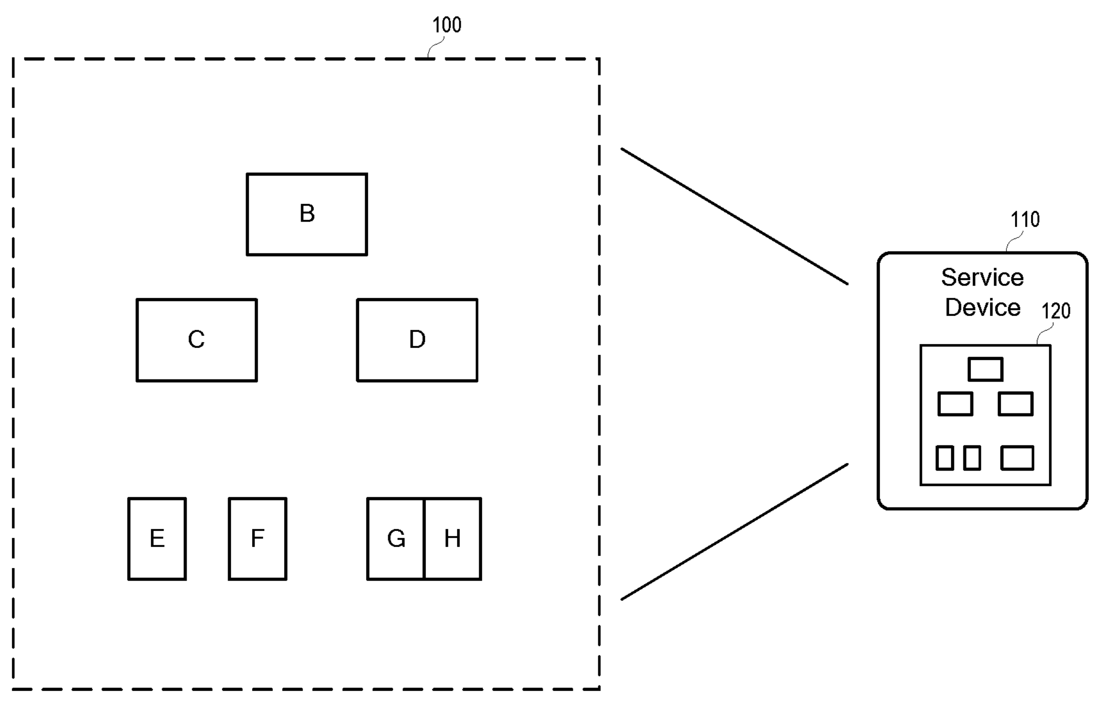
FIG. 3 is an architecture of a system to provide automated synchronization of locations of movable items according to some embodiments.
Figure 4:
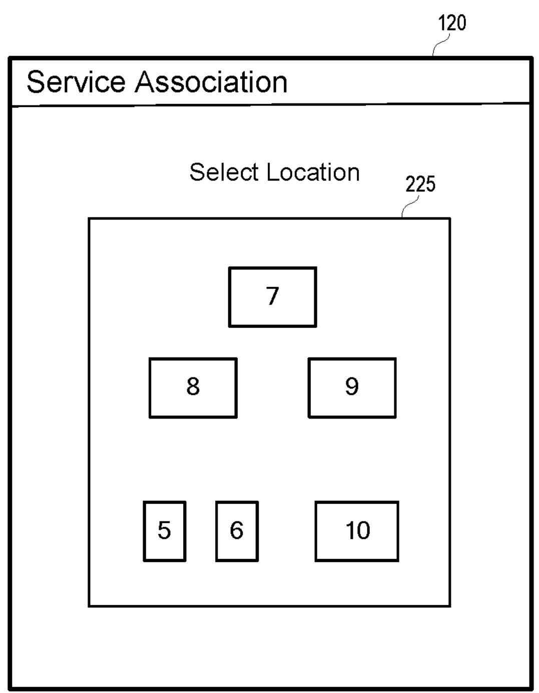
FIG. 4 is a user interface of a system presenting a synchronized map of item locations according to some embodiments.

The location identifiers (i.e., 1 to 8) may differ from the table identifiers (i.e., A through H) in order to provide flexibility such as the ability to combine two or more items into a single item, and to simplify the addition or removal of items from area 100. For example, FIG. 3 depicts area 100 after removal of table A, movement of tables B, C and D, and movement of table G to a location immediately-adjacent table H. According to some embodiments, a new map is generated based on the new locations of the items and pushed to service device 110. As shown in FIG. 4, user interface 120 of device 110 now shows map 225 depicting the new locations of the items and associating an identifier with each location. Each moved item is associated with a new location identifier, but embodiments are not limited thereto.

Figure 5:
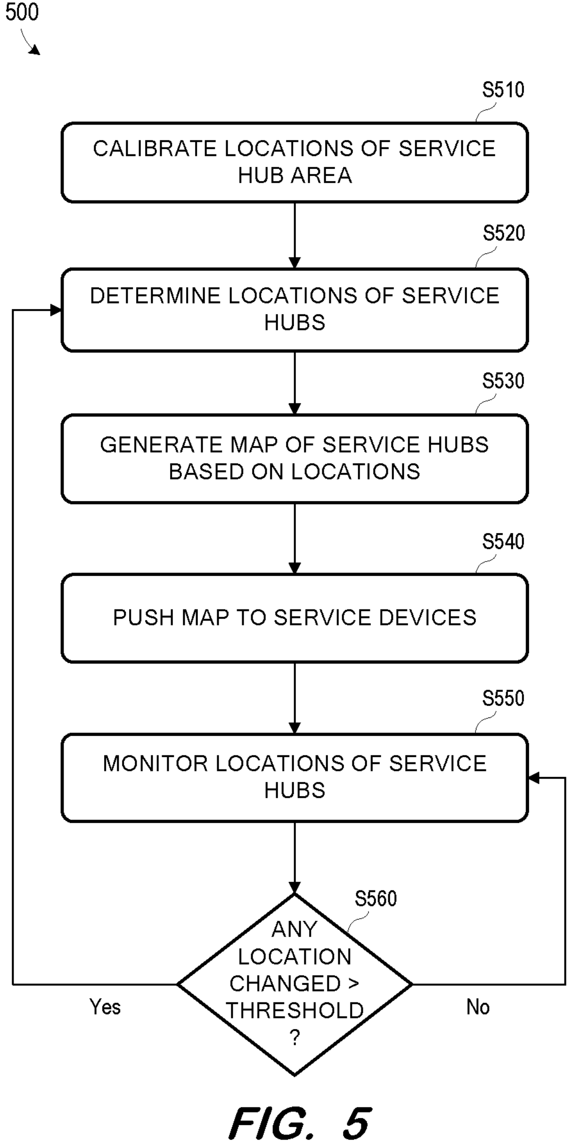
FIG. 5 is a flow diagram of a process to provide automated synchronization of locations of movable items according to some embodiments.

FIG. 5 is a flow diagram of process 500 to provide automated synchronization of locations of movable items according to some embodiments. Process 500 may be performed by a central computing system which generates a map of the locations and provides the map to point-of-sales systems and other systems which facilitate the provision of services to the movable items. Process 500 may be implemented by program code stored in any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

The movable items described herein will also be referred to as service hubs due to the prospect of associating services therewith and providing services thereto. Initially, at S510, locations within a service hub area are calibrated. According to one example which will be described in detail below, three or more Bluetooth LE receivers are fixed within an area to include (or including) the service hubs. A Bluetooth LE beacon is placed at several locations within the area and, for each location, the strength of the signal output by the beacon is measured at each of the receivers and recorded. Calibration at S510 may be desirable or necessary in the case of particular wireless detection technologies, and not needed if other wireless detection technologies (e.g., Global Positioning System (GPS), Indoor Positioning System (IPS)) are utilized.

Locations of service hubs within the service hub area are determined at S520. The service hubs may be moved into the service hub area and positioned after S510 and prior to S520. The locations of the service hubs may be determined using any suitable technology, including radiofrequency, audio, and/or visual-based location detection technologies. According to some embodiments, a Bluetooth LE beacon is coupled to each service hub and broadcasts an identifier associated with the service hub to which it is coupled. The aforementioned receivers may receive a signal from each beacon and the locations of the service hubs may be determined based on the strengths of the signals received by each receiver from each beacon. For example, the strength of the signals received by each receiver from a particular beacon (i.e., as identified by the broadcast identifier) may be compared with the signals received from each calibrated location of the area to determine a closest calibrated location. Other methods of triangulation may be employed at S520 to determine the locations of the service hubs.

A map of the service hubs is determined at S530 based on their determined locations. The map may depict the location of each service hub within the service hub area. The map may associate each service hub with a location identifier as described above, and/or with a service hub identifier unique to each service hub.

At S540, the map is pushed to service devices. The service devices may comprise computing systems intended to specify one or more services to be provided to a service hub. A service device may be operated to define a service and to associate the service with a location identifier of the map. In some embodiments, the service device also detects the signal from the nearest beacon and uses this information to automatically associate the defined service with the corresponding location identifier of the map. The service may then be provided to the appropriate service hub by referring to the map and the location identifier associated with the service.

While the map is being used as described above, the locations of the service hubs are monitored at S550. Such monitoring may consist of periodically determining the locations of the service hubs as described with respect to S520. Next, at S560, it is determined whether any service hub location has changed in an amount greater than a threshold distance. The threshold distance may be any suitable distance. For example, if a given service hub has moved greater than the threshold distance, it is assumed that the location of the given service hub may be difficult to determine based on the existing map. S560 may additionally or alternatively include a determination of whether a total magnitude of the movement of all service hubs exceeds a threshold.

Flow returns to S550 if the determination at S560 is negative. Accordingly, flow cycles between S550 and S560 and the current map remains unchanged as long as the service hubs have not moved more than a specified amount. If the determination at S560 is positive, flow returns to S520 to re-determine the locations of the service hubs and to generate a new map based thereon at S530. According to some embodiments, a certain number of positive determinations at S560 may trigger re-calibration as described above.

Figure 6:
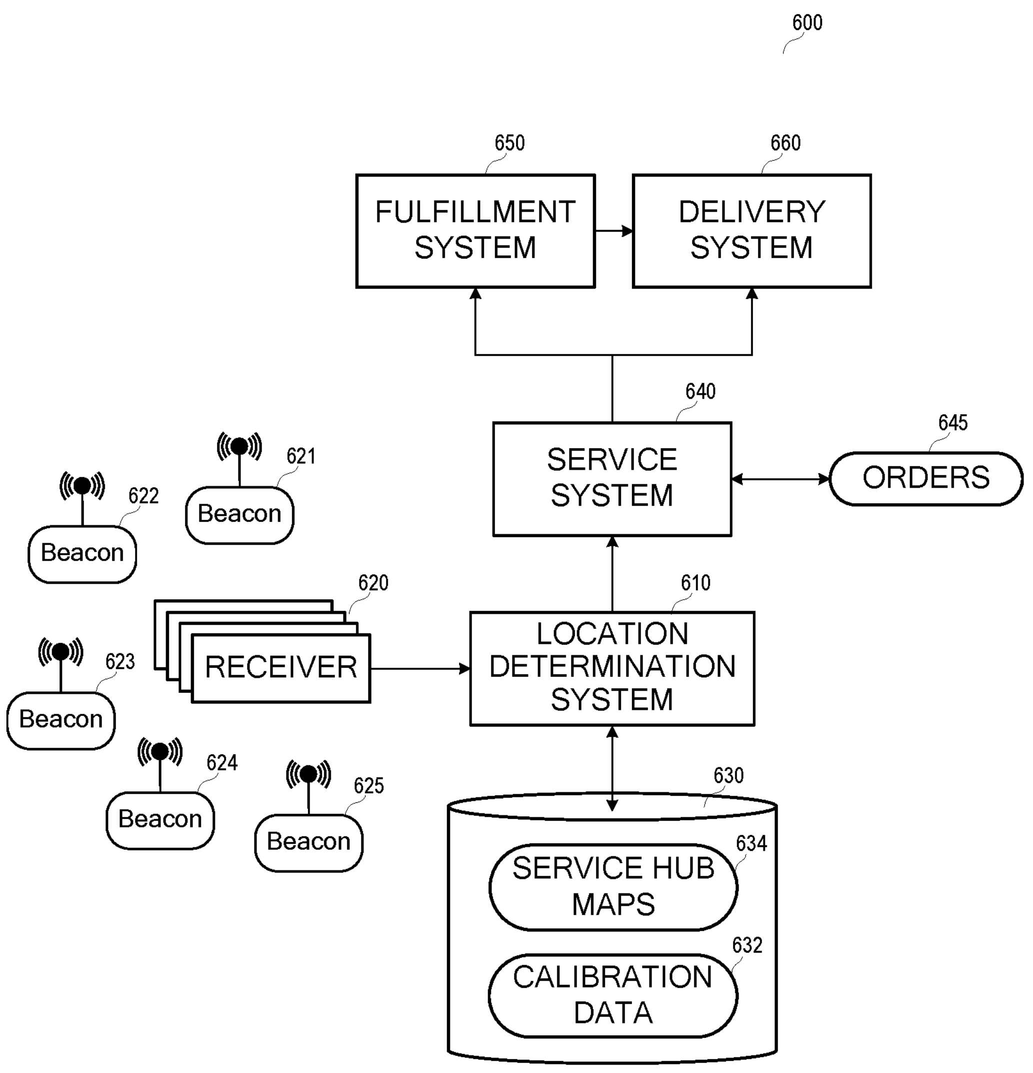
FIG. 6 is a block diagram of a system to determine and use synchronized item locations according to some embodiments.

FIG. 6 is a block diagram of system 600 to determine and use synchronized item locations according to some embodiments. Each of the illustrated components of system 600 may be implemented using any suitable combinations of computing hardware and/or software that are or become known. In some embodiments, two or more components of system 600 are implemented by a single computing device.

The components of system 600 may be located on-premise, cloud-based (e.g., in which computing resources are virtualized and allocated elastically), distributed (e.g., with distributed storage and/or compute nodes) and/or deployed in any other suitable manner. Each component may comprise disparate cloud-based services, a single computer server, a cluster of servers, and any other combination that is or becomes known. All or a part of each component may utilize Infrastructure-as-a-Service (IaaS), Platform-as-a-Service (PaaS) and/or Software-as-a-Service (SaaS) offerings owned and managed by one or more different entities as is known in the art.

Location determination system 610 may comprise program code of an application which is executable by a computing system to cause the computing system to perform process 500. For example, system 610 receives information from receivers 620 describing the strength and the origin of signals received thereby. Receivers 620 may be fixedly positioned within an area and may be configured to receive wireless signals including identifiers of the devices from which the signals were transmitted.

The signals are received from beacons 621 through 625. Beacons 621 through 625 may comprise Bluetooth LE beacons but embodiments are not limited thereto. Bluetooth LE is a wireless personal area network technology which can be used by applications to discover services, query for services, and exchange small amounts of data with nearby devices. Bluetooth LE uses significantly less power than "classic" Bluetooth, and many operating systems natively support Bluetooth LE.

Each of beacons 621 through 625 transmits a signal which includes its respective unique identifier and is received by each of receivers 620. In a specific example, each of beacons 621 through 625 broadcasts an advertising packet including a Universally Unique Identifier (UUID) of a service and a UUID (and/or temporary media access control (MAC) address) of the beacon. According to some embodiments, the beacon identifier is a regularly-changing identifier derived from a shared cryptographic starting point (see, e.g., Exposure Notification Framework) to prevent malicious third parties from copying beacon identifiers and disturbing system operation.

During a calibration process, one or more of beacons 621 through 625 are placed at various locations and information regarding the strength of signals received by receivers 620 from each location is stored in data store 630 as calibration data 632.

During operation, each of beacons 621 through 625 is coupled to a respective service hub (not shown) and signals therefrom are received by receivers 620. Location determination system 610 determines the location of each service hub based on the strengths of the received signals and on calibration data 632 as described above. Location determination system 610 also generates a service hub map depicting the locations of each service hub and stores the map among maps 634.

Service system 640 may comprise a point-of-sale system, for example, which receives a current service hub map from system 610. Service system 640 may create one or more service orders 645 describing services to be provided and associate each order 645 with a location identifier associated with one of the service hubs depicted in the current service hub map. Service system 640 sends an order 645 and its associated location identifier to fulfillment system 650 (e.g., a kitchen) for fulfillment of the order 645. Fulfillment system 650 notifies delivery system 660 of completion of the order 645 and delivery system 660 uses the current service hub map and the location identifier associated with the order 645 to determine a service hub to which the order 645 should be delivered.

Figures 7, 8:
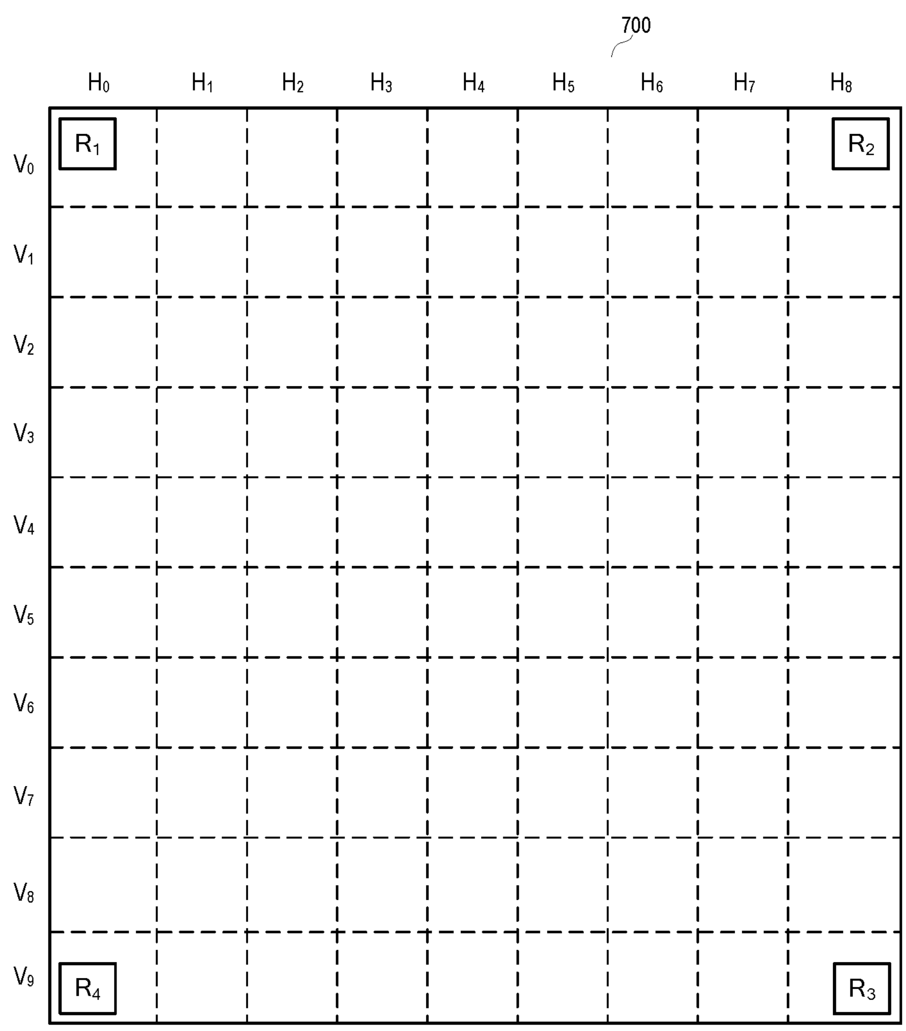
FIG. 7 is a logical representation of locations with respect to receivers according to some embodiments.
FIG. 8 is a tabular representation of calibration data according to some embodiments.

FIG. 7 is a diagram illustrating calibration of locations within area 700 according to some embodiments. Area 700 is logically divided into a 9×10 grid where each square of the grid is associated with a coordinate ($H_i$, $V_j$), but embodiments are not limited thereto. Receivers $R_1$ through $R_4$ are located at fixed positions within area 700.

In one example of calibration, a Bluetooth LE beacon is placed in a square of the grid and a strength of the signal received from the beacon by each of receivers $R_1$ through $R_4$ is recorded. This process is then repeated for each square of the grid. FIG. 8 is a tabular representation of calibration data including the recorded signal strengths for each square (i.e., "location") of the grid. Embodiments may use any signal strength-related metric as calibration data, including but not limited to dB, attenuation, W/m, etc.

Figures 9, 10:
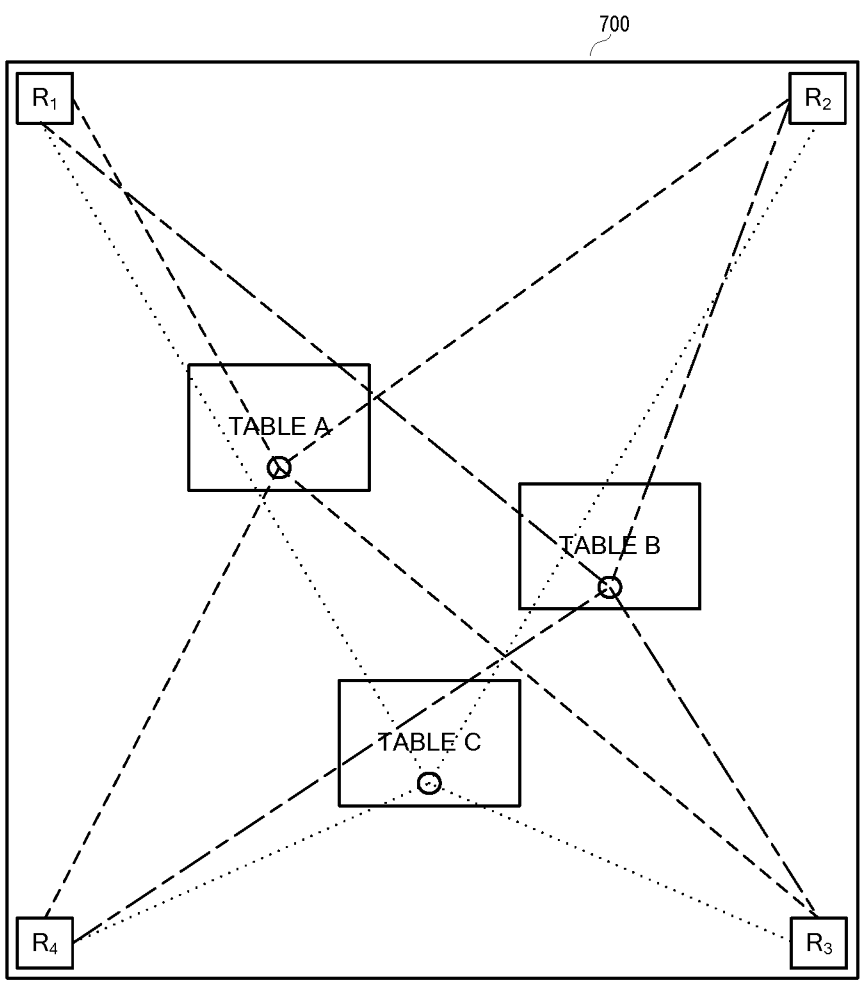
FIG. 9 illustrates items and beacon-to-receiver signal strengths associated with each item according to some embodiments.
FIG. 10 is a tabular representation of beacon-to-receiver signal strengths and corresponding estimated locations according to some embodiments.

FIG. 9 illustrates detection of locations using fixed receivers and pre-stored calibration data according to some embodiments. Area 700 is shown including Tables A through C, each of which has a respective beacon coupled thereto. Each beacon transmits a signal which is received by each of receivers $R_1$ through $R_4$. as illustrated. It should be noted that the signal from each beacon is not directional as shown but emanates outward in all directions.

Table 1000 of FIG. 10 shows the strength of the signal received from each beacon by each receiver. The location of each beacon (and therefore the location of its associated table) may be estimated based on the data of table 1000 and the calibration data of table 800, using any similarity metric and/or interpolation technique.

Figure 11:
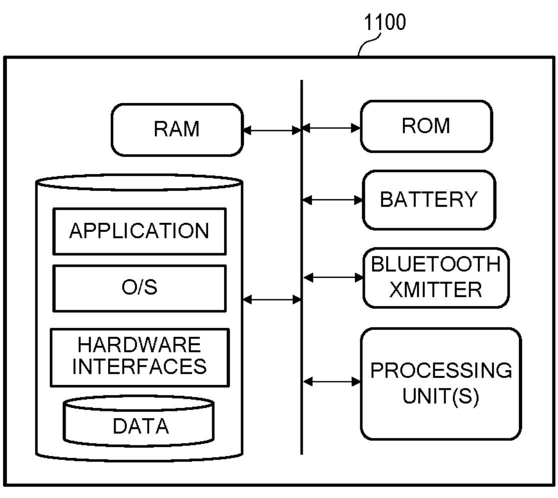
FIG. 11 is a block diagram of a wireless communication device according to some embodiments.

FIG. 11 is a block diagram of wireless communication device 1100 according to some embodiments. Device 1100 may be wirelessly-detectable and capable of being coupled to a movable item as described herein. Device 1100 includes a persistent storage system storing an application, an operating system, hardware interfaces and data. One or more processing units of device 1100 execute program code of the application, operating system, and hardware interfaces to transmit a signal including an identifier via a Bluetooth transmitter.

Figure 12:
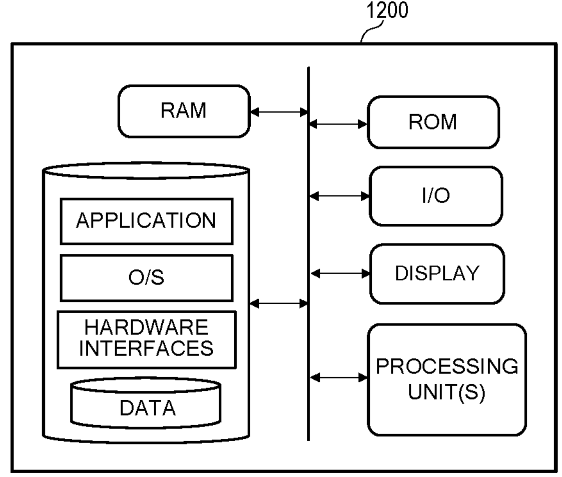
FIG. 12 is a block diagram of a computing system according to some embodiments.

FIG. 12 is a block diagram of computing system 1200 according to some embodiments. Computing system 1200 may comprise a computer server. System 1200 includes a persistent storage system storing an application, an operating system, hardware interfaces and data. One or more processing units of system may execute program code of the application, operating system, and hardware interfaces to generate calibration data, to determine locations of items based on the calibration data and on received signals, and to generate maps based on the determined locations.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, RAM, or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
a memory storing executable program code;
a computing device for presenting a user interface;
a processing unit to execute the executable program code to cause the computing system to:
determine a first location of each of a plurality of movable items;
generate a first map representing the determined first locations of each of the plurality of movable items;
associate a first service with the first locations of the represented locations, wherein the first service is provided to the first locations based on the first map;
present the first map and the first locations of each of the plurality of movable items on the user interface;
determine that one or more of the plurality of items has moved more than a threshold distance;
in response to the determination that one or more of the plurality of items has moved more than a threshold distance, determine a second location of each of the plurality of movable items and generate a second map representing the determined second locations of each of the plurality of movable items;
present the second map and the second locations of each of the plurality of movable items on the user interface; and
associate a second service with a third location of the represented second locations, wherein the second service is provided to the third location based on the second map.

2. The computing system of claim 1, wherein determination of the location of each of the plurality of movable items comprises:
determination, for each of a plurality of fixed locations, of a strength of a signal received from the fixed location by each of a plurality of fixed receivers;
determination, for each of a plurality of devices coupled to a respective one of the plurality of movable items, of a strength of a signal received from the device by each of the plurality of fixed receivers; and
determination of the location of each of the plurality of movable items based on the strengths of signals received from each of the plurality of fixed locations by each of the plurality of fixed receivers and the strengths of signals received from each of the plurality of devices by each of the plurality of fixed receivers.

3. The computing system of claim 2, wherein each of the plurality of devices is a Bluetooth LE transmitter.

4. The computing system of claim 1, the processing unit to execute the program code to cause the computing system to:
transmit the first map to a service device; and
receive an identifier of the first service and an identifier of the first location of the represented locations from the service device.

5. The computing system of claim 1, wherein determination that one or more of the plurality of items has moved more than a threshold distance comprises:
automatically monitoring the locations of the plurality of items.

6. A method comprising:
determining a first location of each of a plurality of movable service hubs;
generating a first map depicting the determined first locations of each of the plurality of movable service hubs;
presenting the first map and the first locations of each of the plurality of movable items on a user interface of a computing device;
associating a first service with the first locations of the depicted locations, wherein the first service is provided to a first movable service hub located at the first location based on the first map;
determining that one or more of the plurality of movable service hubs has moved more than a threshold distance;
in response to determining that one or more of the plurality of movable service hubs has moved more than a threshold distance, determining a second location of each of the plurality of movable service hubs and generating a second map depicting the determined second locations of each of the plurality of movable service hubs;
presenting the second map and the second locations of each of the plurality of movable items on the user interface of the computing device; and
associating a second service with a third location of the depicted second locations, wherein the second service is provided to a second movable service hub located at the third location based on the second map.

7. The method of claim 6, wherein determining the location of each of the plurality of movable service hubs comprises:
determining, for each of a plurality of fixed locations, of a strength of a signal received from the fixed location by each of a plurality of fixed receivers;
determining, for each of a plurality of devices coupled to a respective one of the plurality of movable service hubs, of a strength of a signal received from the device by each of the plurality of fixed receivers; and
determining the location of each of the plurality of movable service hubs based on the strengths of signals received from each of the plurality of fixed locations by each of the plurality of fixed receivers and the strengths of signals received from each of the plurality of devices by each of the plurality of fixed receivers.

8. The method of claim 7, wherein each of the plurality of devices is a Bluetooth LE transmitter.

9. The method of claim 6, further comprising:
transmitting the first map to a service device; and
receiving an identifier of the first service and an identifier of the first location of the depicted locations from the service device.

10. The method of claim 6, wherein determining that one or more of the plurality of movable service hubs has moved more than a threshold distance comprises:
automatically monitoring the locations of the plurality of movable service hubs.

11. A non-transitory computer-readable medium storing program code executable to cause a computing system to:
determine a first location of each of a plurality of movable service hubs;
generate a first map depicting the determined first locations of each of the plurality of movable service hubs;
associate a first service with the first locations of the depicted locations, wherein the first service is provided to a first movable service hub located at the first location based on the first map;

present the first map and the first locations of each of the plurality of movable items on a user interface of a computing device;

determine that one or more of the plurality of movable service hubs has moved more than a threshold distance;

in response to the determination that one or more of the plurality of movable service hubs has moved more than a threshold distance, determine a second location of each of the plurality of movable service hubs and generate a second map depicting the determined second locations of each of the plurality of movable service hubs;

present the second map and the second locations of each of the plurality of movable items on the user interface of the computing device; and associate a second service with a third location of the depicted second locations, wherein the second service is provided to a second movable service hub located at the third location based on the second map.

12. The non-transitory medium of claim 11, wherein determination of the location of each of the plurality of movable service hubs comprises:

determination, for each of a plurality of fixed locations, of a strength of a signal received from the fixed location by each of a plurality of fixed receivers;

determination, for each of a plurality of devices coupled to a respective one of the plurality of movable service hubs, of a strength of a signal received from the device by each of the plurality of fixed receivers; and determination of the location of each of the plurality of movable service hubs based on the strengths of signals received from each of the plurality of fixed locations by each of the plurality of fixed receivers and the strengths of signals received from each of the plurality of devices by each of the plurality of fixed receivers.

13. The non-transitory medium of claim 12, wherein each of the plurality of devices is a Bluetooth LE transmitter.

14. The non-transitory medium of claim 11, the program code executable to cause a computing system to:

transmit the first map to a service device; and receive an identifier of the first service and an identifier of the first location of the depicted locations from the service device.

15. The non-transitory medium of claim 11, wherein the determination that one or more of the plurality of movable service hubs has moved more than a threshold distance comprises:

automatically monitoring of the locations of the plurality of movable service hubs.

* * * * *